United States Patent
Porcella et al.

(10) Patent No.: US 10,415,286 B1
(45) Date of Patent: Sep. 17, 2019

(54) HINGE WITH FEEDBACK

(71) Applicants: John A. Porcella, Sunnyvale, CA (US); Michael A. Damianakis, Sunnyvale, CA (US); Robert L. Coish, Sunnyvale, CA (US); Matthew B. Frazer, Sunnyvale, CA (US)

(72) Inventors: John A. Porcella, Sunnyvale, CA (US); Michael A. Damianakis, Sunnyvale, CA (US); Robert L. Coish, Sunnyvale, CA (US); Matthew B. Frazer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 15/678,651

(22) Filed: Aug. 16, 2017

Related U.S. Application Data

(60) Provisional application No. 62/396,963, filed on Sep. 20, 2016.

(51) Int. Cl.
*E05D 11/10* (2006.01)
*E05D 3/02* (2006.01)
(Continued)

(52) U.S. Cl.
CPC ............... *E05D 11/10* (2013.01); *E05D 3/02* (2013.01); *E05D 11/00* (2013.01); *E05D 11/1028* (2013.01); *E05F 15/40* (2015.01); *E05F 15/60* (2015.01); *F16C 11/04* (2013.01); *G05B 6/02* (2013.01); *G06F 3/016* (2013.01); *G06F 3/041* (2013.01); *H02K 11/21* (2016.01); *H02K 11/24* (2016.01); *H02P 7/18* (2013.01); *H02P 8/20* (2013.01); *E05Y 2400/202* (2013.01); *E05Y 2400/53* (2013.01); *E05Y 2400/81* (2013.01);
(Continued)

(58) Field of Classification Search
CPC ........... E05D 11/10; E05D 3/02; E05D 11/00; E05D 11/1028; E05F 15/40; E05F 15/60; H02K 11/21; H02K 11/24; F16C 11/04; G05B 6/02; G06F 3/016; G06F 3/041; H02P 7/18; H02P 8/20; E05Y 2400/202; E05Y 2400/53; E05Y 2400/81; E05Y 2900/132; E05Y 2900/531; E05Y 2900/606
USPC ........................................................ 700/275
See application file for complete search history.

(56) References Cited

U.S. PATENT DOCUMENTS

| | | | |
|---|---|---|---|
| 3,971,581 A | | 7/1976 | Montgomery |
| 4,281,898 A | * | 8/1981 | Ochiai ................. G02B 7/1828 359/606 |

(Continued)

FOREIGN PATENT DOCUMENTS

DE       102006019581 A1    10/2007

*Primary Examiner* — Kenneth M Lo
*Assistant Examiner* — Michael W Choi
(74) *Attorney, Agent, or Firm* — Young Basile Hanlon & MacFarlane, P.C.

(57) ABSTRACT

An assembly includes a first structure, a second structure, a hinge that connects the first structure to the second structure for rotation of the first structure relative to the second structure around an axis, and a motion control component. The motion control component applies a feedback force to the hinge in response to an external force that is applied to the first structure. A magnitude of the feedback force is determined based on a current angular position of the first structure relative to the second structure.

20 Claims, 8 Drawing Sheets

(51) Int. Cl.
  *E05D 11/00* (2006.01)
  *E05F 15/60* (2015.01)
  *E05F 15/40* (2015.01)
  *G05B 6/02* (2006.01)
  *G06F 3/041* (2006.01)
  *G06F 3/01* (2006.01)
  *H02P 7/18* (2006.01)
  *H02P 8/20* (2006.01)
  *H02K 11/21* (2016.01)
  *H02K 11/24* (2016.01)
  *F16C 11/04* (2006.01)

(52) U.S. Cl.
  CPC ... *E05Y 2900/132* (2013.01); *E05Y 2900/531* (2013.01); *E05Y 2900/606* (2013.01)

(56) References Cited

U.S. PATENT DOCUMENTS

| | | | |
|---|---|---|---|
| 4,689,849 A | 9/1987 | Eger et al. | |
| 6,175,204 B1 | 1/2001 | Calamatas | |
| 6,588,811 B1 | 7/2003 | Ferguson | |
| 6,742,388 B1 | 6/2004 | Osentoski | |
| 8,225,458 B1 | 7/2012 | Hoffberg | |
| 2009/0107050 A1* | 4/2009 | Suzuki | E05F 15/603 49/360 |
| 2009/0189550 A1* | 7/2009 | Sun | H02N 2/0075 318/51 |
| 2009/0212719 A1* | 8/2009 | Wedel | A61B 6/462 315/297 |
| 2009/0217596 A1 | 9/2009 | Neundorf et al. | |
| 2012/0293297 A1* | 11/2012 | Joguet | G06F 3/045 338/47 |
| 2015/0226406 A1* | 8/2015 | Lashina | H05B 37/0218 362/235 |
| 2016/0003331 A1 | 1/2016 | Topfer et al. | |
| 2017/0030132 A1* | 2/2017 | Elie | E05F 15/611 |
| 2017/0030134 A1* | 2/2017 | Elie | E05F 15/71 |
| 2017/0241182 A1* | 8/2017 | Hung | E05F 15/78 |
| 2018/0328097 A1* | 11/2018 | Holt | E05F 15/611 |

* cited by examiner

HINGE WITH FEEDBACK

CROSS-REFERENCE TO RELATED APPLICATIONS

This application claims the benefit of U.S. Provisional Application No. 62/396,963, filed on Sep. 20, 2016, entitled, "Hinge with Feedback," the content of which is incorporated herein by reference in its entirety.

TECHNICAL FIELD

The application relates generally to hinges.

BACKGROUND

Hinges connect two structures together to allow pivoting of one or both of the structures around an axis of the hinge. The magnitude of force required to cause motion of one of the structures with respect to the other at the hinge may be dependent on, for example, friction present in the hinge itself.

SUMMARY

One aspect of the disclosed embodiments is an assembly that includes a first structure, a second structure, a hinge that connects the first structure to the second structure for rotation of the first structure relative to the second structure around an axis, and a motion control component. The motion control component applies a feedback force to the hinge in response to an external force that is applied to the first structure. A magnitude of the feedback force is determined based on a current angular position of the first structure relative to the second structure.

Another aspect of the disclosed embodiments is an assembly that includes a first structure, a second structure, a hinge that connects the first structure to the second structure for rotation of the first structure relative to the second structure around an axis, a sensor that detects an externally applied force, and a motion control component. The motion control component applies a feedback force to the hinge. A magnitude of the feedback force is set to a first value when the externally applied force is below a threshold value and the magnitude of the feedback force is set to a second value when the externally applied force is above the threshold value, wherein the first value is greater than the second value.

Another aspect of the disclosed embodiments is an assembly that includes a first structure, a second structure, a hinge that connects the first structure to the second structure for rotation of the first structure relative to the second structure around an axis, a touch sensor that detects contact by a user, wherein the touch sensor outputs a touch signal, and a motion control component. The motion control component applies a feedback force to the hinge according to a first force profile when the touch signal is below a threshold and applies the feedback force to the hinge according to a second force profile when the touch signal is above the threshold.

Systems and methods are also described herein.

DETAILED DESCRIPTION

The disclosure includes structures that are pivotally connected, such as by a hinge, in which a variable feedback force is applied. The amount of feedback can be controlled and modified based on, as examples, preferences and sensed conditions. The systems and methods described herein can be applied to various mechanical systems, such as doors, switches, levers, hinged laptop displays, and other structures that incorporate pivotally connected members.

Figure 1:
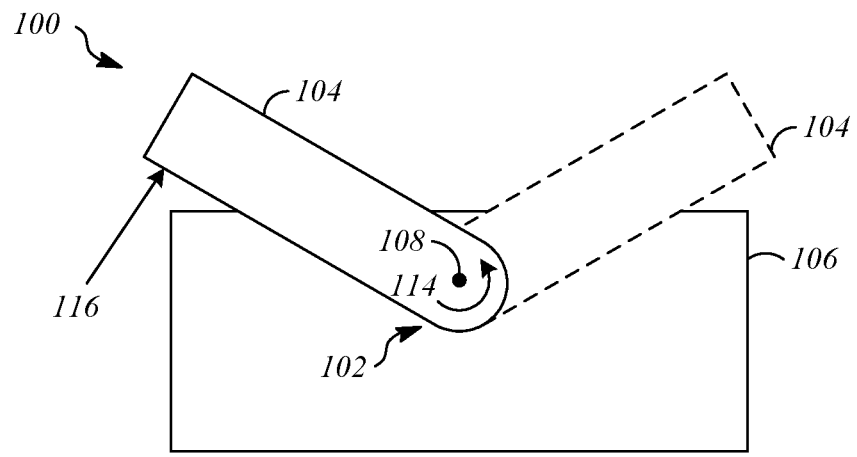
FIG. 1 is a top view illustration showing a hinge assembly.

FIG. 1 is a top view illustration showing a hinge assembly 100. The hinge assembly 100 includes a hinge 102 that connects a first structure 104 and a second structure 106 for rotation of the first structure 104 relative to the second structure 106 around an axis 108. In the illustrated example, the hinge 102 is of a typical design that may be implemented using a pin that interconnects the first structure 104 and the second structure 106, such that the first structure 104 moves in a circular arc relative to the second structure 106. Alternatively, the hinge 102 can be implemented using other types of structures, such as linkages that cause relative motion of the first structure 104 and the second structure 106 in non-circular patterns, such as in floating pivot or floating axis hinge designs.

In the illustrated example, the first structure 104 is shown in a first position and in a second position (depicted in broken lines) relative to the second structure 106. In some embodiments, the first structure 104 is rotatable with respect to the second structure 106 over a limited angular range of motion. In other embodiments, the angular range of motion of the first structure 104 with respect to the second structure 106 is not limited, and the first structure 104 may rotate continuously with respect to the second structure 106.

Figure 2:
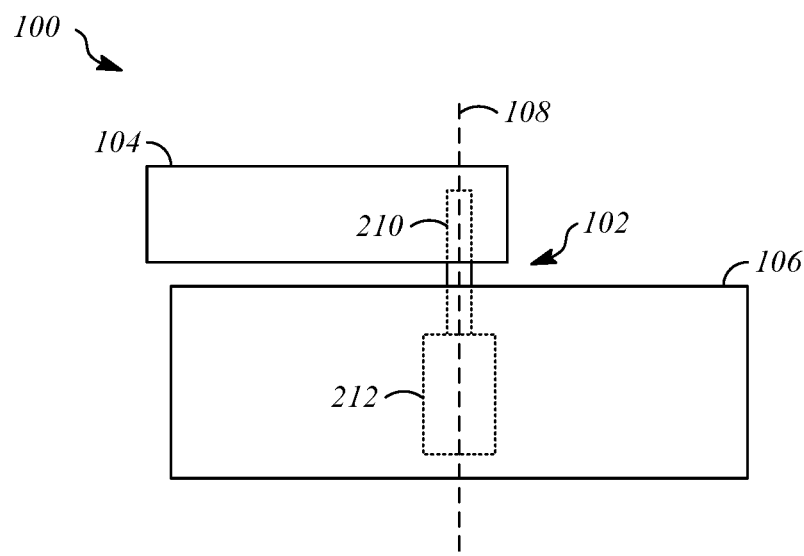
FIG. 2 is a side view illustration showing the hinge assembly.

FIG. 2 is a side view illustration showing the hinge assembly 100. To connect the first structure 104 and the second structure 106, the hinge 102 may include a connecting structure such as an axle 210 that is connected to the first structure 104 and the second structure 106, such as by being seated in cavities formed in the first structure 104 and the second structure 106, or in any other suitable manner. The hinge 102 may include additional components that connect the axle 210 to the first structure 104 and/or the second structure 106 or constrain motion of the axle 210 relative to the first structure 104 and/or the second structure 106, such as bushings, bearings, springs, or mechanical clutches. As an example, a mechanical clutch may be incorporated in the second structure 106 to apply a substantially constant friction force to the axle 210 to resist rotational motion of the first structure 104 and the axle 210 with respect to the second structure 106, such that the first structure 104 only rotates relative to the second structure 106 when the friction force applied by the mechanical clutch is overcome.

One of the first structure 104 and the second structure 106 may be fixed with respect to the axle 210 and the other of the first structure 104 and the second structure 106 may be rotatable with respect to the axle 210 to allow rotation of the first structure 104 relative to the second structure 106. In the illustrated example, the axle 210 is fixed with respect to the first structure 104 and the axle 210 is rotatable with respect to the second structure 106.

To control motion of the first structure 104 and the second structure 106 and to provide tactile feedback to a user, the hinge assembly 100 includes a motion control component 212. The motion control component 212 may be rigidly connected to the second structure 106. The motion control component 212 is operable to do one or more of apply a friction force to the axle 210 to resist motion of the axle 210, apply torque 114 (FIG. 1) to the axle 210 in a direction that is opposite a direction of an external force 116 (FIG. 1) that is applied to one of the first structure 104 or the second structure 106, and apply torque 114 to the axle 210 in a direction of the external force 116 that is applied to one of the first structure 104 or the second structure 106.

Figure 3:
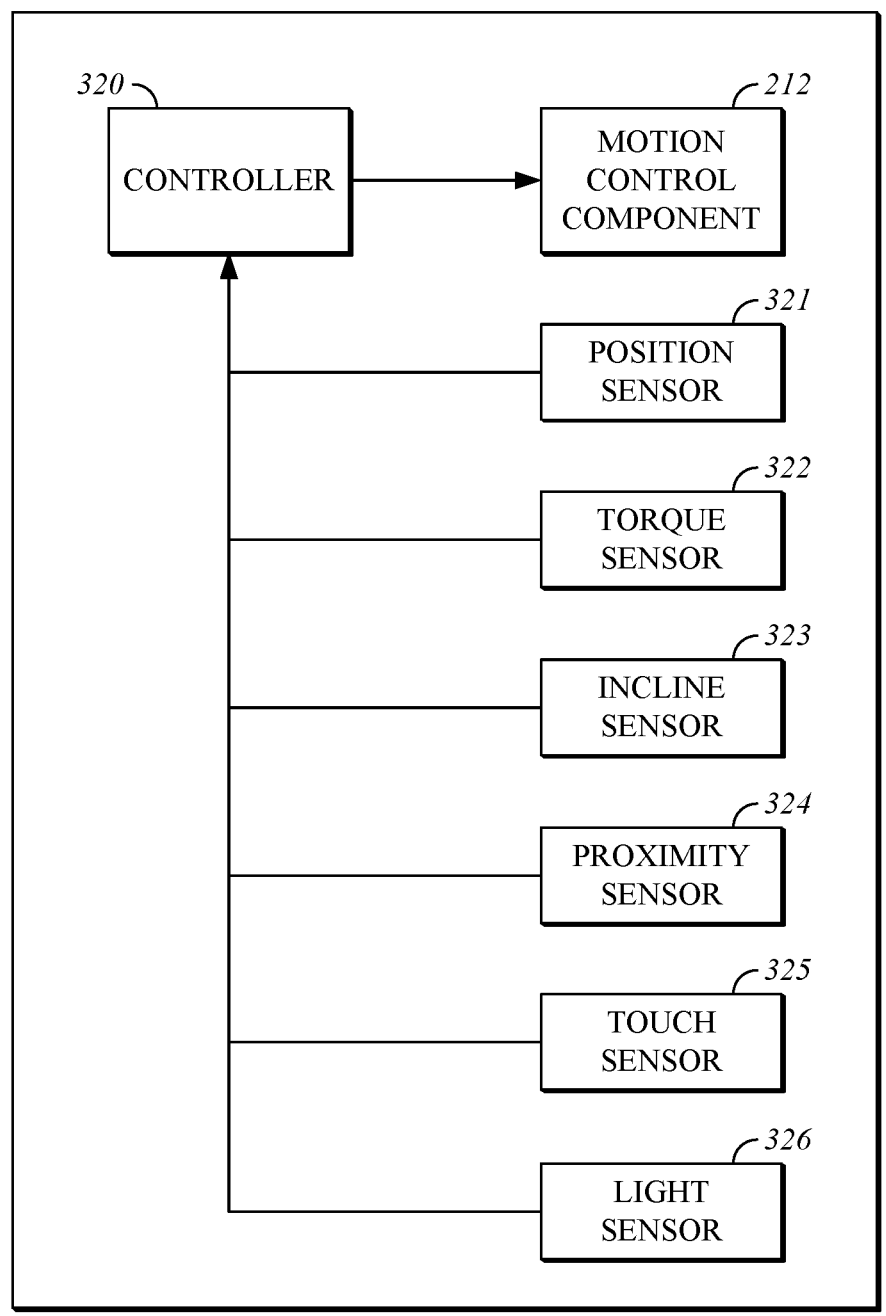
FIG. 3 is a block diagram showing a motion control system.

FIG. 3 is a block diagram showing a motion control system 318 that may be utilized with the hinge assembly 100. The motion control system 318 includes the motion control component 212 and regulates operation of the motion control component 212 in order to apply friction and/or torque to the hinge 102 at a magnitude that allows for smooth operation of the hinge 102 while providing tactile feedback to the user of the hinge 102. The motion control system 318 may include a controller 320 and one or more sensors that provide inputs to the controller 320 that are used by the controller 320 to control operation of the motion control component 212. The one or more sensors may include, as examples, a position sensor 321, a torque sensor 322, an incline sensor 323, a proximity sensor 324, a touch sensor 325, and/or a light sensor 326. Based on the inputs, the controller 320 determines a control signal and transmits the control signal to the motion control component 212, which causes operation of the motion control component 212 in accordance with the control signal, such as causing application of a feedback force of a particular magnitude to the axle 210. The feedback force may be a resisting force that is applied in opposition to an external force or may be a supplementing force that is applied in the same direction as the external force.

The controller 320 is a computing device of any type that is able to receive input from other components in the form of signals and/or data and is able to transmit output to other components in the form of signals and/or data. In some embodiments, the controller 320 includes a processor and a memory, where the processor is able to execute instructions stored in the memory that cause the processor to regulate operation of the motion control component 212 according to the methods that will be discussed herein. In some embodiments, the controller 320 includes hardware that is configured specifically to regulate operation of the motion control component 212 according to the methods that will be discussed herein, such as an application-specific integrated circuit (ASIC) or a field-programmable gate array (FPGA).

In some embodiments, the motion control component 212 is an element or mechanism that is operable to apply a variable friction force to the axle 210 in order to change the degree by which motion of the first structure 104 with respect to the second structure 106 is resisted by the motion control system 318. In such embodiments, the motion control component 212 may lack components that are operable to apply torque to the axle 210, and may instead function solely by resisting motion at a variable rate.

In some embodiments, the motion control component 212 is operable to apply variable torque to the axle 210. Torque applied to the axle 210 by the motion control component 212 may cause motion of the first structure 104 with respect to the second structure 106, or may restrain the first structure 104 against movement with respect to the second structure 106. As one example, the motion control component 212 may include electric motor. As another example, the motion control component 212 may include a stepper motor, which may incorporate the position sensor 321, to apply a resisting force or a supplementing force to the axle 210. As another example, the motion control component 212 may include a collar that is positioned on the axle 210 and incorporates piezoelectric elements that slightly increase or decrease the inside diameter of the collar to vary a resisting force applied to the axle 210 by the collar.

Operation of the motion control component 212 may be regulated by the controller 320 using the motion control component 212 in combination with feedback in the form of a position signal that is output by the position sensor 321. The position signal may be indicative of the position of the first structure 104 relative to the second structure 106, and may be provided to the controller 320 by the position sensor 321. As examples, the position sensor 321 may be an optical encoder, an electromagnetic encoder, a variable resistor, or a potentiometer. Other types of sensors may be utilized as the position sensor 321.

In some embodiments, the force profile specifies a feedback force or torque to be applied by the motion control component dependent upon the current angular position of the first structure 104 relative to the second structure 106. Thus, the feedback force or torque applied to the axle 210 may vary as the first structure 104 is rotated with respect to the second structure 106. As one example, a force profile may specify a high resisting force or torque at or near an end limit of rotational motion of the first structure 104 relative to the second structure 106. This high resisting force or torque may be used to resist motion of the first structure 104 away from a closed position toward an open position, or to slow motion of the first structure 104 relative to the second structure 106 as the first structure 104 nears a fully open position.

In some embodiments, the force profile may specify one or more areas of high feedback force or torque along the angular range of motion of the first structure 104 with respect to the second structure 106. These areas of high feedback force or torque may be overlaid on a baseline level of feedback force or torque that resists motion of the first structure 104 with respect to the second structure 106. The high-level of feedback force may be applied bidirectionally to the first structure 104 both in a first direction and a second direction relative to the second structure 106. When the force profile applied using the motion control component 212 in dependence on position signal output by the position sensor 321 to, for example, increase the resisting force or torque to provide feedback to the user that is analogous to the sensation provided mechanical detents. This may allow the user to, for example, quickly find a desired angular position for the first structure 104 relative to the second structure 106, such as by stopping at the third simulated detent. In addition, the controller 320 may allow the user to specify aspects of the force profile, such as the number and location of the simulated detents, through a user interface (not shown in FIG. 3).

In some implementations, the force profile may be modified to provide tactile feedback. For example, the resisting force may be increased, or a vibration (buzzing) may be applied using a sawtooth waveform in order to warn of hazardous conditions on the other side of a door.

Operation of the motion control component 212 may be regulated by the controller 320 using the motion control component 212 in combination with feedback in the form of a torque signal that is output by the torque sensor 322. In one embodiment in which the motion control component 212 is an electric motor or a stepper motor, the torque sensor 322 measures current supplied to the motion control component 212, since current draw is related to torque. The torque signal may be any type of signal that is related to torque, and need not be expressed in units traditionally utilized to measure torque.

Operation of the motion control component 212 may be regulated by the controller 320 using the motion control component 212 in combination with feedback in the form of an incline signal that is output by the incline sensor 323. The incline signal may be utilized by the controller to estimate a force component resulting from gravity acting on the first structure 104. In response to the incline signal, the controller 320 may modify operation of the motion control component 212 to restrain motion of the first structure 104 that would otherwise result from gravity acting on the first structure 104, or may modify operation of the motion control component 212 by detecting the external force 116 (e.g., using the torque sensor 322), and applying the torque 114 to the axle 210 and the first structure 104 in the same direction as the external force 116 in order to help the user to overcome gravity acting on the first structure 104.

Operation of the motion control component 212 may be regulated by the controller 320 using the motion control component 212 in combination with feedback in the form of a proximity signal that is output by the proximity sensor 324. As one example, the controller 320 may increase the resisting force applied by the motion control component 212 in response to determining, based on the proximity signal, that an external object is positioned near, for example, the first structure 104. In some embodiments, increasing the resisting force applied by the motion control component 212 can be controlled such that the magnitude of the resisting forces indicates to a user who is manually applying force to the first structure 104 that continued motion of the first structure 104 may result in contact of the first structure 104 with the external object. In some embodiments, the controller 320 may cause operation of the motion control component 212 to produce the resisting force with a magnitude that prevents further motion of the first structure 104 with respect to the second structure 106.

Operation of the motion control component 212 based on the proximity signal may be applied to a fixed-location door to prevent the door from being opened rapidly toward an unseen person. This may be applied to a door on a movable structure, such as vehicle, to prevent the door from contacting external objects that are temporarily positioned near the door. In some embodiments, the proximity sensor 324 may be applied to a door and be configured to detect proximity of an object between movable and fixed portions of the door (e.g., the first structure 104 and the second structure 106), and increase the resisting force to restrain the door from pinching the object between the fixed and movable portions.

Operation of the motion control component 212 may be regulated by the controller 320 using the motion control component 212 in combination with feedback in the form of a touch signal that is output by the touch sensor 325. The touch sensor 325 may be located on, for example, the first structure 104 in order to recognize application of force to the first structure 104 by the user or an intention to apply force to the first structure 104 by the user.

In some embodiments, the touch sensor 325 may be an electrical sensor that recognizes contact with the user's body by monitoring an electrical signal, such as capacitance, where changes in the electrical signal may interpreted as engagement or disengagement of the user's body with the touch sensor 325. In some embodiments, the touch sensor 325 may be an electromechanical component such as a pressure-operated switch. The controller 320 may regulate operation of the motion control component 212 based on the presence, absence, or magnitude of contact by the user's body with the touch sensors 325.

In some embodiments, a light signal from the light sensor 326 may be utilized to modify operation of the motion control component 212 by the controller 320. As an example, the first structure 104 may be or include a glare-sensitive display component, and the light sensor 326 may be incorporated in or connected to the first structure 104. The controller 320 may, based on the light signal, estimate glare at one or more positions of the first structure 104 relative to the second structure 106, for example, by modeling glare as proportional to light incident on the light sensor 326. Based on the estimated glare, the controller 320 may increase a resisting force applied by the motion control component 212 to provide feedback to the user that simulates a mechanical detent at a location that minimizes glare incident on the first structure 104. Thus, for example, a light signal from the light sensor 326 can be used by the controller to determine a glare estimate based on the light signal, and the controller can set one or more simulated detent positions at locations that minimize glare from light incident on first structure 104.

In some implementations, the force profile may be configured to hold the first structure 104 relative to the second structure 106 in a "closed" position, such that the hinge assembly 100 functions as a lock. In such implementations, the controller 320 may receive signals from other components, such as metal detectors, magnetic strip card readers, voice recognition systems, RFID readers, fingerprint readers, retinal scan devices, and other sensor systems that could serve to modify behavior of the motion control component 221, such as by opening in response to presence of a credential, automatically opening in response to presence of a person, or automatically locking based on presence on an unauthorized person.

In some implementations, operation of the hinge assembly 100, including signals from any of the included sensors from the motion control system 318, can be used as input signals for an occupancy detection system. For example, when the hinge assembly 100 is incorporated in a door for a room, use of the door can be detected by the motion control system 318, reported to the occupancy detection system and used to perform functions such as turning on lights.

In some implementations, the motion control system 318 can implement non-contact gesture recognition to modify operation of the motion control component 221 based on non-contact gesture commands.

In some implementations, static air pressure sensors may be used by the motion control system 318 to implement an air pressure compensation system. In this way, the operation speed of the hinge assembly 100 and the closed position can be controlled regardless of large pressure differentials.

Figure 4:
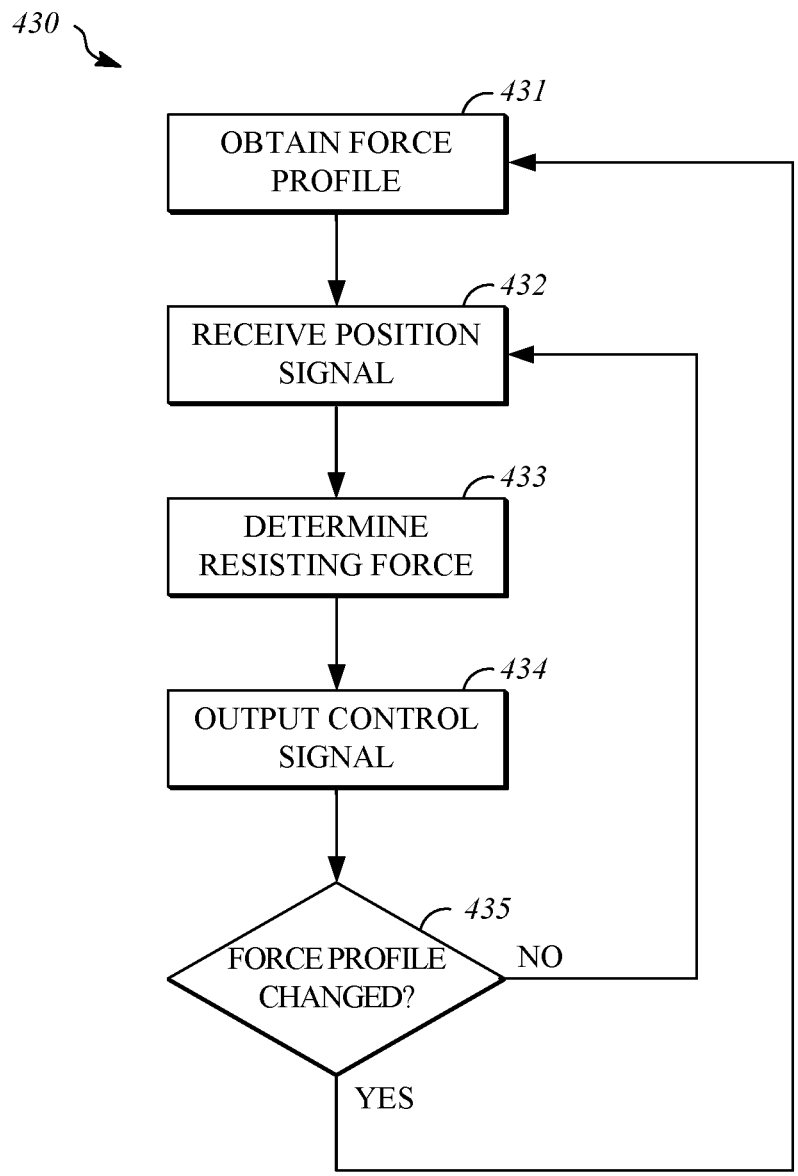
FIG. 4 is a flowchart showing a hinge control process according to a first example.

FIG. 4 is a flowchart showing a hinge control process 430 according to a first example. The hinge control process 430 may be implemented by, for example, the controller 320 of the motion control system 318.

In operation 431, a force profile is obtained. The force profile may be expressed as information that includes one or more force values and may include a relationship between the one or more force values and a variable value, such as a value expressed by one of the input signals that is received by the controller 320. As an example, the force profile may specify force values that correspond to relative angular positions of the first structure 104 and the second structure 106. As examples, the force profile may be expressed as a set of discrete values, the force profile may be expressed as a mathematical relationship, or the force profile may be expressed as a curve.

In some embodiments, the force profile may be a predetermined force profile obtained from a storage device that is associated with the controller 320. In some embodiments, the force profile may be obtained in response to receiving a user selection of a predetermined force profile. In some embodiments, the force profile may be user-specified.

In operation 432 a position signal is received. The position signal represents the position of the first structure 104 relative to the second structure 106, and may represent the angular orientation of the first structure 104 relative to the second structure 106. The position signal may be received, for example, by the controller 320 of the motion control system 318 from the position sensor 321.

In operation 433 a feedback force is determined. The feedback force is a force applied to the motion control component 212 in order to resist or assist motion of the first structure 104 relative to the second structure 106. The magnitude of the resisting force may be determined by the controller 320 based on the force profile that was obtained in operation 431 and the position signal that was obtained in operation 432. The feedback force may be applied in the same direction as an external force or in opposition to the external force. In operation 434, a control signal is output. The control signal regulates operation of the motion control component 212. The control signal is generated by the controller 320 to cause the motion control component 212 to apply a force to the axle 210 according to the magnitude of the feedback force that was determined in operation 433.

In operation 435, a determination has been made as to whether the force profile has changed. If the force profile has changed, the process returns to operation 431 to update the force profile. Otherwise, the process returns to operation 432 to again receive the position signal, and the hinge control process 430 continues by updating the position signal and outputting the control signal in dependence upon the position signal such that the feedback force changes according to the force profile as the position signal changes.

In some embodiments, the force profile is changed in response to a user input, such as a user-made selection of a different force profile. In some embodiments, the force profile may be changed based on sensor inputs. For example, the force profile may be changed in response to a movement speed of the first structure 104, as measured by the position sensor 321, such as by increasing the magnitude of the resisting force applied by the motion control component 212 in response to sensing a high-speed movement of the first structure 104, or by decreasing the magnitude of the resisting force applied by the motion control component 212 in response to sensing a decrease in the movement speed of the first structure 104.

As one example, the hinge control process 430 may be utilized to supply feedback to users regarding end limits of travel of the first structure 104 relative to the second structure 106. To provide feedback regarding the end limits of travel, the force profile utilized by the hinge control process 430 may include a first high resistance area near a first end limit of travel of the first structure with respect to the second structure, a second high resistance area near a second end limit of travel of the first structure with respect to the second structure, and an intermediate area between the first high resistance area and the second high resistance area, wherein the magnitudes of the resisting force applied in the first high resistance area and the second high resistance area are greater that the magnitudes of the resisting force applied in the intermediate area.

As another example, the hinge control process 430 may be utilized to provide feedback to users regarding positions between end limits of travel such as by simulating the presence of mechanical detents as previously described.

Feedback regarding end limits of travel, simulated detents, and other types of feedback supplied using the hinge control process 430 may be applied, for example, to a laptop computer with a hinged display screen in order to provide tactile feedback to the user when opening and closing the hinged display screen relative to the base portion of the laptop computer. In addition, feedback may be applied to the hinged display screen of a laptop computer to indicate battery state of charge, by modulating the force of simulated detents based on state of charge.

Figure 5:
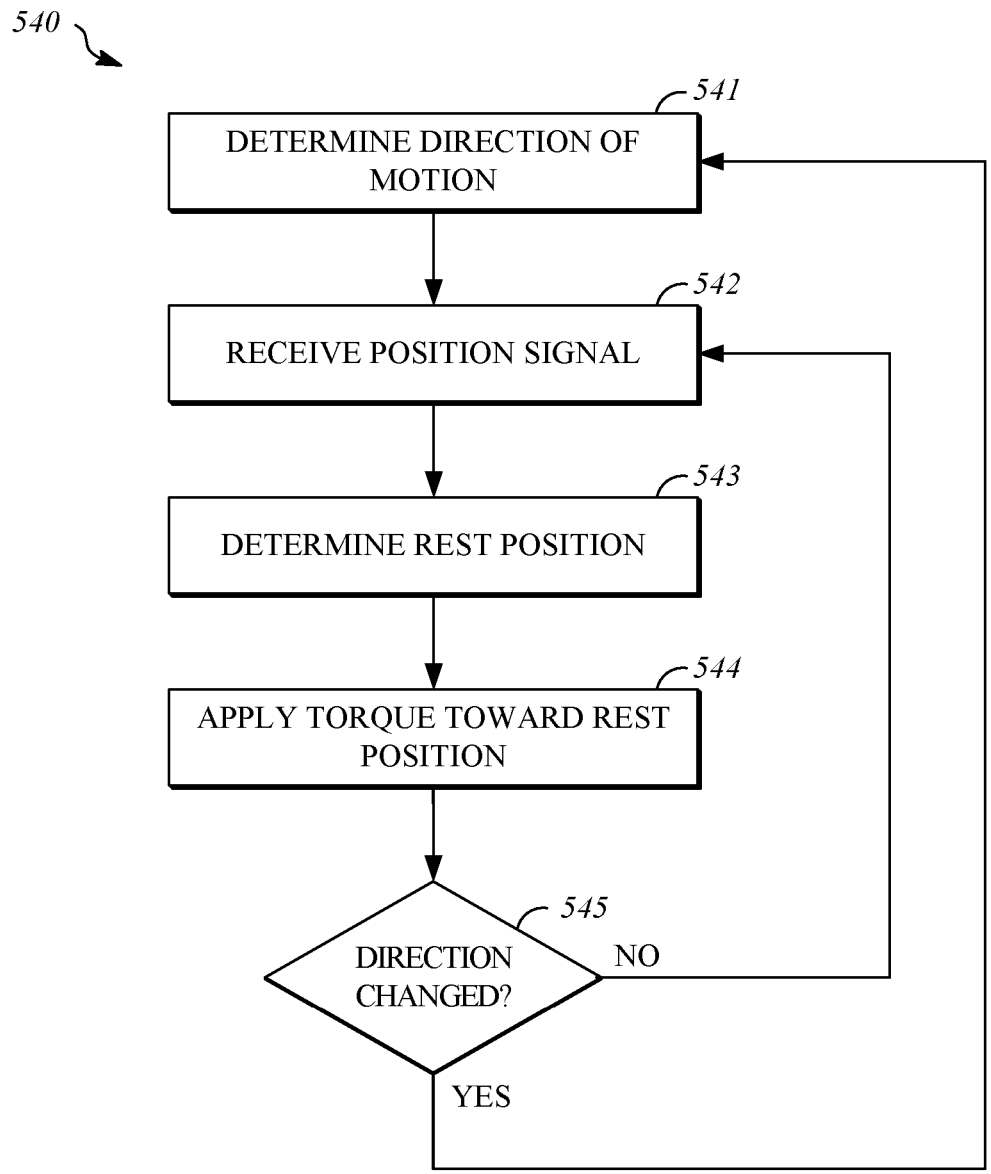
FIG. 5 is a flowchart showing a hinge control process according to a second example.

FIG. 5 is a flowchart showing a hinge control process 540 according to a second example. The hinge control process 540 may be implemented by, for example, the controller 320 of the motion control system 318.

In operation 541 a direction of motion is determined, such as a direction of motion of the first structure 104 relative to the second structure 106. The direction of motion may be determined for example, by monitoring the position signal output by the position sensor 321 and comparing a first relative position of the first structure 104 and the second structure 106 to a second position relative position of the first structure 104 and the second structure 106.

In operation 542 a position signal is received. The position signal represents a current relative position of the first structure 104 and the second structure 106. The position signal may be obtained, for example, from the position sensor 321.

In operation 543 a rest position is determined. The rest position represents a position that the first structure 104 is biased to by the motion control component 212 in the absence of an external force applied by the user. In some embodiments, the rest position is a single fixed position. In some embodiments, the rest position is selected from a group of multiple fixed positions, such as the simulated detent positions described previously. In such embodiments, determining the rest position may include selecting the closest rest position from the group of rest positions, determining the rest position may include selecting the closest rest position in the current direction of travel of the first structure 104 relative to the second structure 106, or determining the rest position may include selecting the closest rest position opposite the current direction of travel of the first structure 104 relative to the second structure 106.

In some embodiments, the rest position is a relative position that is determined based on the current relative position of the first structure 104 and the second structure 106 and an offset value. In one example, rest position may be determined by applying the offset value to the current relative position without regard to the current direction of motion of the first structure 104 with respect to the second structure 106. In another example, the rest position may be determined by applying the offset value to the current relative position in a direction that is opposite the current direction of the motion of the first structure 104 with respect to the second structure 106. In another example, the rest position may be determined by applying the offset value to the current relative position in the direction of the current direction of the motion of the first structure 104 with respect to the second structure 106.

In operation 544, torque is applied toward the rest position. Operation 544 may be performed by sending a control signal from the controller 320 to the motion control component 212, such that the motion control component 212 applies torque to the axle 210 at an appropriate magnitude and direction, according to the determination in operation 543. Operation 544 may include continuing application of torque until the rest position is reached. In some embodiments, if the rest position is reached, application of torque may be ceased. In some embodiments, if the rest position is reached, torque or resisting force may be applied to resist motion away from the rest position until the first structure 104 is again moved relative to the second structure 106 by a user-applied external force.

As a result of the torque applied in operation 544, the motion control component 212 may simulate a spring-like feedback effect, for example, by retracting slightly away from the direction of motion when the external force applied by the user is released or reduced. The magnitude of this effect may be adjusted, such as by user inputs received through a user interface and supplied to the controller 320 of the motion control system 318.

In operation 545, if the direction of the external force applied to the first structure 104 has changed, the process returns to operation 541 to update the direction of the external force. Otherwise, the process returns to operation 542.

As examples, the hinge control process 540 may be utilized to force the first structure 104 to assume predetermined discrete positions with respect to the second structure 106 when not acted upon by an external force, or to resist motion of the first structure 104 with a simulated spring action such that the first component retracts slightly in opposition to its previous direction of motion (i.e., in opposition to the direction of the external force) when the external force is released. The simulated spring action may move the first structure 104 relative to the second structure 106 by a predetermined distance when the external force is released.

Figure 6:
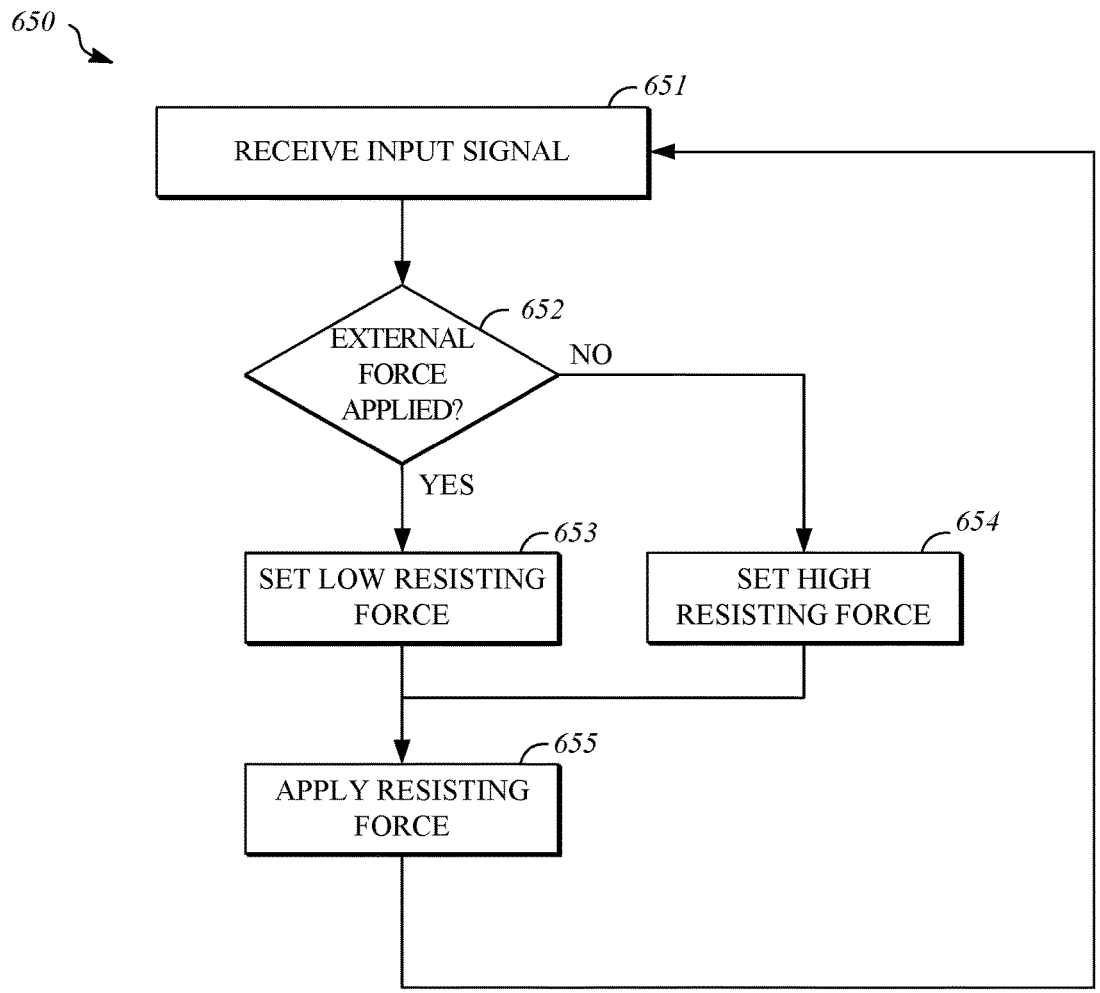
FIG. 6 is a flowchart showing a hinge control process according to a third example.

FIG. 6 is a flowchart showing a hinge control process 650 according to a third example. The hinge control process 650 may be implemented by, for example, the controller 320 of the motion control system 318.

In operation 651, a torque signal is received. The torque signal may be received, for example, by the controller 320 from the torque sensor 322. The torque signal may, in part, represent a direction and magnitude of an external force applied to the first structure 104, such as by the user.

In operation 652, a determination is made as to whether an external force has been applied, for example, to the first structure 104 by a user. The determination of whether an external force has been applied may be made by monitoring the torque signal or the position signal. A change in a property of the torque signal or position signal may indicate that an external force has been applied to the first structure 104. As one example, a magnitude of the torque signal above a threshold value may indicate that an external force has been applied to the first structure 104. As another example, a rate of change of the torque signal above a threshold value may indicate that an external force has been applied to the first structure 104. As another example, a change of the position signal above a threshold value may indicate application of an external force. As another example, a rate of change of the position signal above a threshold value may indicate application of an external force. If it is determined at operation 652 that an external force has been applied to the first structure 104, the process proceeds to operation 653. If it is determined at operation 652 that an external force has not been applied to the first structure 104, the process proceeds to operation 654.

The determination made at operation 652 may control whether a resisting force to be applied to the first structure 104 by the motion control component 212 is set to a first magnitude or a second magnitude. At operation 653, in response to determining at operation 652 that an external force has been applied to the first structure 104, a low-magnitude resisting force is set. The low-magnitude resisting force may be selected or determined to allow easy movement of the first structure 104 relative to the second structure 106 by the user. In some implementations, the magnitude of the low-magnitude resisting force is zero. In some implementations, a supplementing force may be applied in the same direction as the external force, to assist the user in moving a heavy object upon sensing the external force. At operation 654, in response to determining at operation 652 that an external force has not been applied to the first structure 104, a high-magnitude resisting force is set. The high-magnitude resisting force may be selected or determined to resist movement of the first structure 104 relative to the second structure 106. For example, the magnitude of the high-magnitude resisting force may be selected or determined (e.g., based in part on other sensor inputs such as the incline signal) to restrain motion of the first structure 104 relative to the second structure 106 in the absence of application of the external force by the user.

Subsequent to operation 653 or operation 654, the process continues to operation 655. At operation 655, the resisting force is applied, such as by application of the resisting force to the first structure 104 by the motion control component 212.

As an example, the hinge control process 650 may allow a high resisting force to be applied to the first structure 104 in the absence of a force applied by the user, with removal of the high resisting force in response to identifying a user intention to change the position of the first structure 104, as expressed by the user's application of force to the first structure 104. The hinge control process may be applied, for example, to restrain motion of a door or other structure that is exposed to unequal air pressure loads, wind loads, or other applied external forces that are less than a threshold value and do not correlate to intent to change the position of the door.

Figure 7:
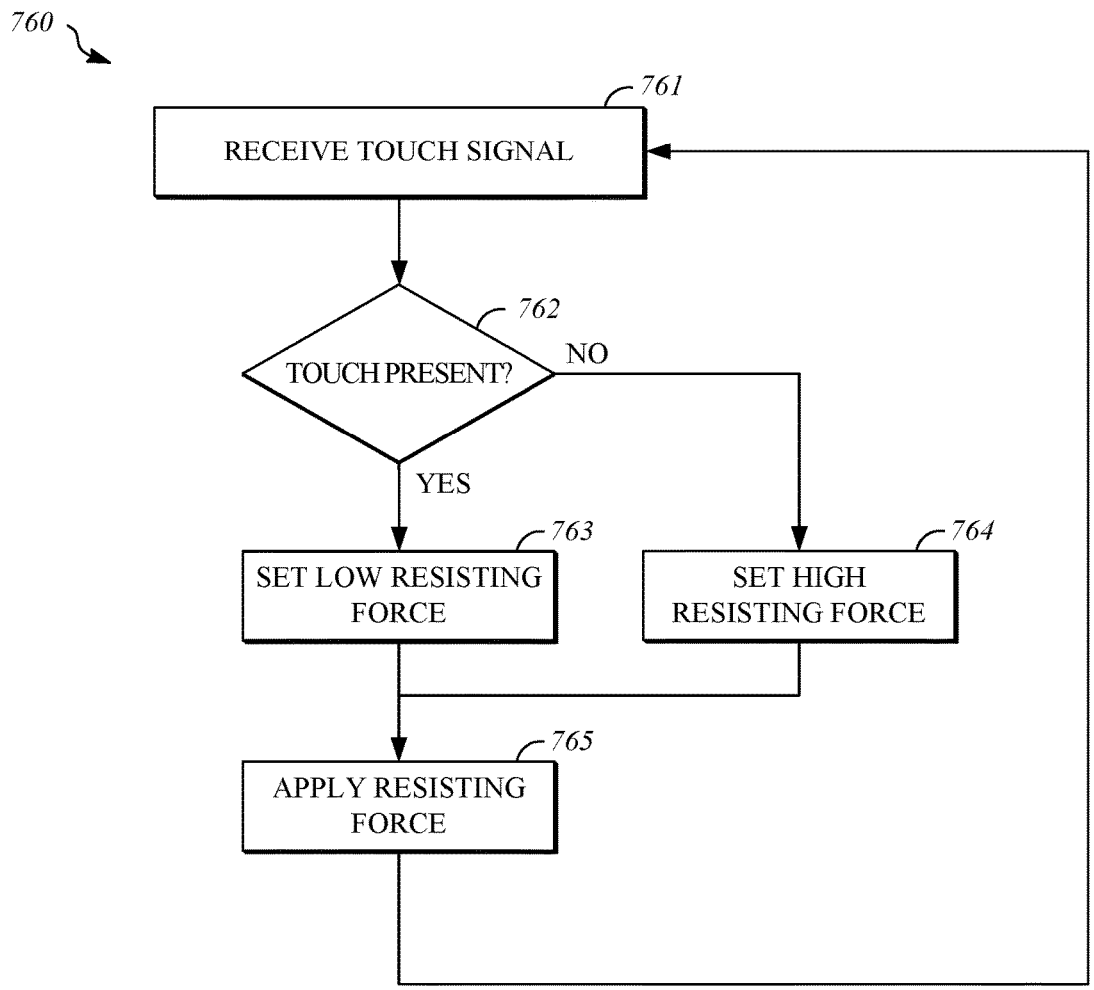
FIG. 7 is a flowchart showing a hinge control process according to a fourth example.

FIG. 7 is a flowchart that shows a hinge control process 760 according to a fourth example. The hinge control process 760 may be implemented by, for example, the controller 320 of the motion control system 318.

In operation 761, a touch signal is received. The touch signal may be received, for example, by the controller 320 from the touch sensor 325. The touch signal may indicate absence presence, and/or magnitude of contact with the user's body. As an example, the touch sensor 325 may be configured to indicate absence presence, and/or magnitude of contact of the first structure 104 with the user's body.

In operation 762, a determination is made as to whether a touch is present. In some embodiments, a touch is considered to be present when the magnitude of the touch signal exceeds a threshold value. The determination at operation 762 may indicate whether a touch is present at the first structure 104. If it is determined at operation 762 that a touch is present, the process proceeds to operation 763. If it is determined at operation 762 that a touch is not present, the process proceeds to operation 764.

The determination made at operation 762 may control whether a resisting force is to be applied to the first structure 104 by the motion control component 212 is set to a first magnitude or a second magnitude. At operation 763, in response to determining at operation 762 that a touch is present at the first structure 104, a low-magnitude resisting force is set. The low-magnitude resisting force may be selected or determined to allow easy movement of the first structure 104 relative to the second structure 106 by the user. In some implementations, the magnitude of the low-magnitude resisting force is zero. At operation 764, in response to determining at operation 762 that a touch is not present at the first structure 104, a high-magnitude resisting force is set. The high-magnitude resisting force may be selected or determined to resist movement of the first structure 104 relative to the second structure 106. For example, the magnitude of the high-magnitude resisting force may be selected or determined (e.g., based in part on other sensor inputs such as the incline signal) to restrain motion of the first structure 104 relative to the second structure 106 in the absence of application of a touch the user.

Subsequent to operation 763 or operation 764, the process continues to operation 765. At operation 765, the resisting force is applied, such as by application of the resisting force to the first structure 104 by the motion control component 212.

As an example, the hinge control process 760 may allow a high resisting force to be applied to the first structure 104 in the absence of contact by the user with the first structure 104, with removal of the high resisting force in response to identifying a user intention to change the position of the first structure 104, as expressed by contact of a portion of the user's body with the first structure 104.

Figure 8:
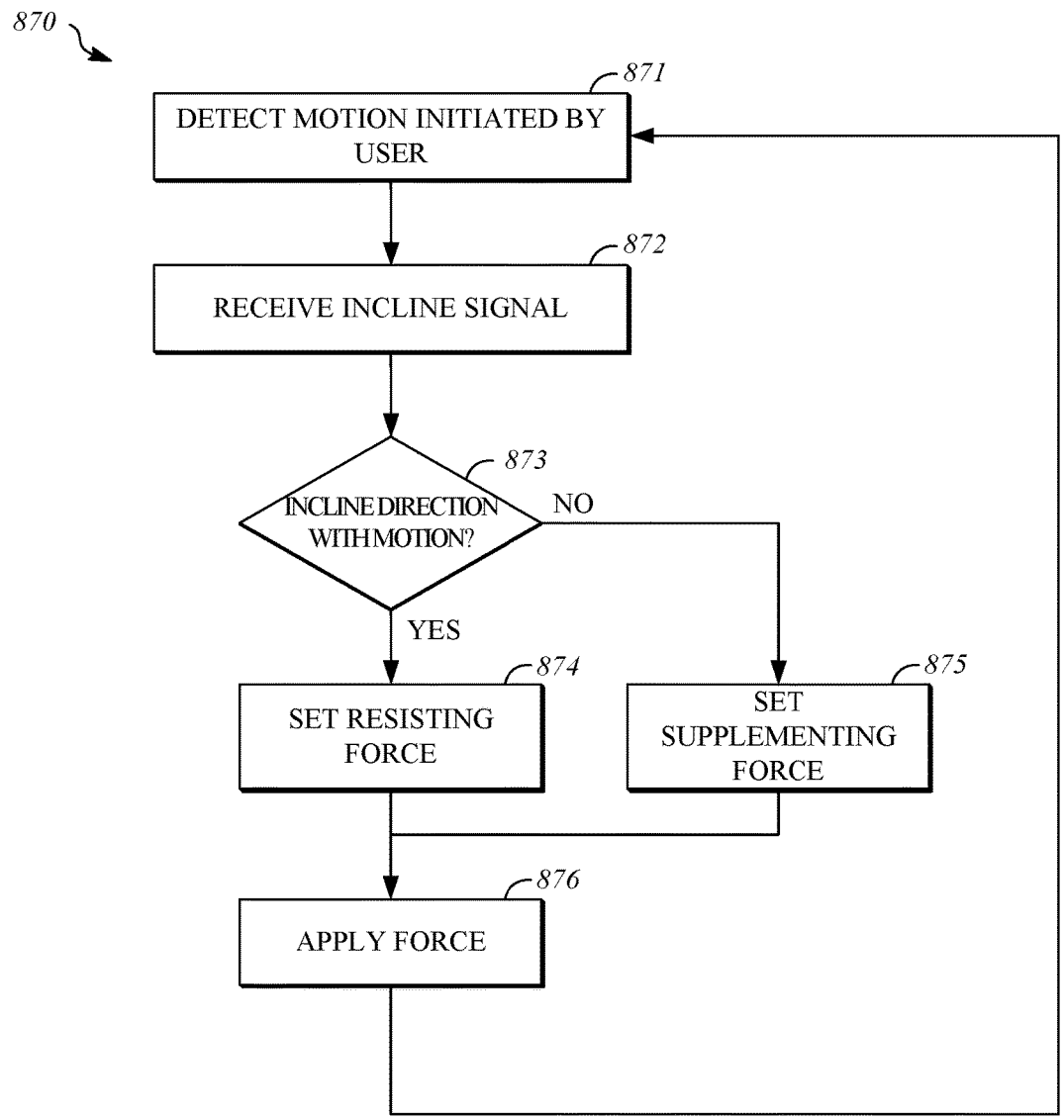
FIG. 8 is a flowchart that shows a hinge control process according to a fifth example.

FIG. 8 is a flowchart that shows a hinge control process 870 according to a fifth example. The hinge control process 870 may be implemented by, for example, the controller 320 of the motion control system 318.

In operation 871, motion initiated by the user is detected. This motion may be a result of an external force applied by the user, as previously described. Motion initiated by the user may be detected as previously described, for example, based on the position signal, the torque signal, and/or the touch signal. The motion may be, for example, motion of the first structure 104 relative to the second structure 106.

In operation 872, the incline signal is received from the incline sensor 323. Based on the direction of the incline signal and the direction of the external force, a determination is made in operation 873 as to whether gravitational force resulting from the inclination of the first structure 104 is in the same direction as the motion initiated by the user, or is opposite in direction as compared to the motion initiated by the user. If the direction of the inclination is with the motion, the process proceeds to operation 874, in which a resisting force is set to oppose the gravitational force resulting from the inclination to prevent unintended rapid motion of the first structure 104 with respect to the second structure 106. The magnitude of the feedback force may be set to approximately equal the magnitude of the force resulting from the inclination, but opposite the direction. If the direction of the inclination is against the motion, the process proceeds to operation 875, in which a supplementing force is set to oppose the gravitational force resulting from the inclination order to assist the user in moving the first structure 104 against the force resulting from the incline. The magnitude of the supplementing force may be set to approximately equal the magnitude of the force resulting from the inclination, but opposite the direction of the force resulting from the incline.

In operation 876 the resisting force or the supplementing force is applied, which may be performed by the motion control component 212 in response to a command signal received from the controller 320. The process then returns to operation 871.

As an example, the hinge control process 870 may allow the user to better control motion at a hinge when the hinged parts are subjected to inclination. As an example, if the first structure 104 is a vehicle door and the second structure 106 is a vehicle body, the hinge control process 870 may be applied to allow easier control of opening and closing the door if the vehicle is parked on a hill. Further types of feedback can be applied to vehicles, such as particular tactile sensations indicating that, as examples, the headlights are on, a window is down, keys are present in the vehicle, or that an object is detected in the path of a door that is being closed.

Figure 9:
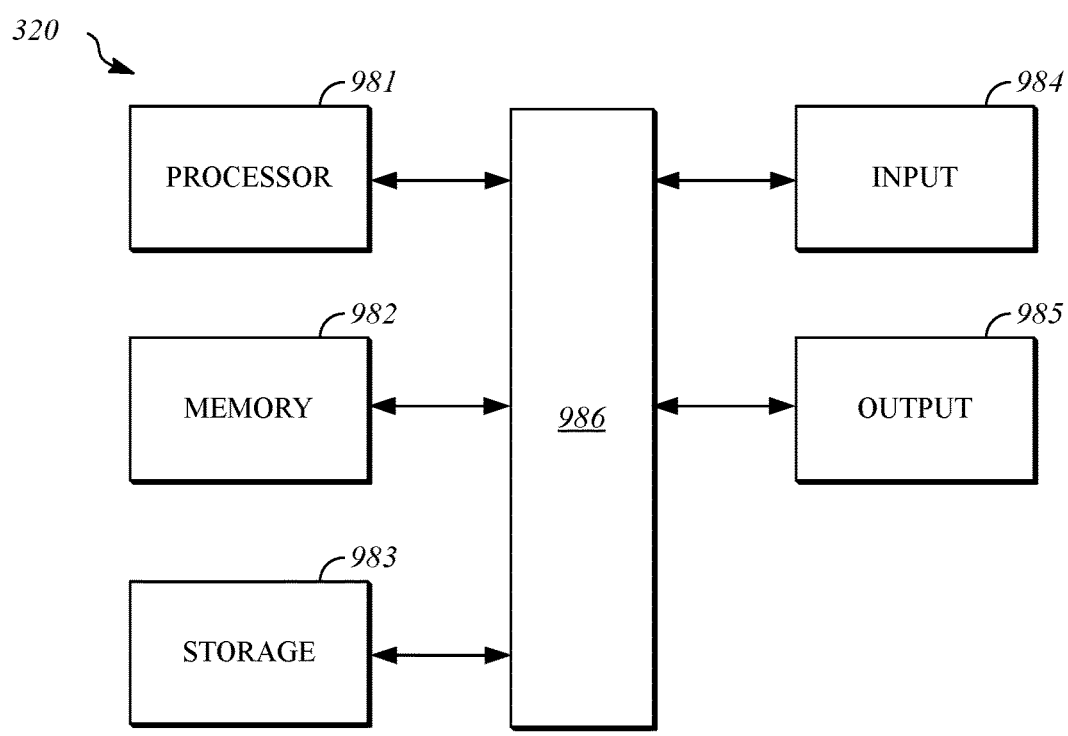
FIG. 9 shows an exemplary hardware configuration for a controller.

FIG. 9 shows an exemplary hardware configuration for the controller 320, which may be used to implement the apparatuses and systems described herein.

The controller 320 may include a processor 981, a memory 982, a storage device 983, one or more input devices 984, and one or more output devices 985. The controller 320 may include a bus 986 or a similar device to interconnect the components for communication. The processor 981 is operable to execute computer program instructions and perform operations described by the computer program instructions. As an example, the processor 981 may be a conventional device such as a central processing unit. The memory 982 may be a volatile, high-speed, short-term information storage device such as a random-access memory module. The storage device 983 may be a non-volatile information storage device such as a hard drive or a solid-state drive. The input devices 984 may include any type of human-machine interface such as buttons, switches, a keyboard, a mouse, a touchscreen input device, a gestural input device, or an audio input device. The output devices 985 may include any type of device operable to provide an indication to a user regarding an operating state, such as a display screen or an audio output.

What is claimed is:

1. An assembly, comprising:
 a first structure;
 a second structure;
 a hinge that connects the first structure to the second structure for rotation of the first structure relative to the second structure around an axis; and
 a motion control component that applies a feedback force to the hinge in response to an external force that is applied to the first structure,
 wherein the motion control component is configured to determine a direction of the external force,
 wherein the motion control component is configured to determine that the external force has been released, and
 wherein the motion control component is configured, in response to the determination that the external force has been released, to determine a rest position based on a current angular position of the first structure relative to the second structure and an offset value and to apply the feedback force in opposition to the direction of the external force subsequent to release of the external force until the rest position is reached.

2. The assembly of claim 1, wherein the feedback force applied to the hinge by the motion control component to urge the first structure toward the rest position is a simulated spring action of the first structure with respect to the second structure.

3. The assembly of claim 1, further comprising:
a controller that regulates the feedback force based on a force profile that specifies the magnitude for the feedback force at each of a plurality of angular positions of the first structure relative to the second structure.

4. The assembly of claim 3, wherein the motion control component includes a position sensor that outputs a position signal indicative of the current angular position of the first structure relative to the second structure.

5. The assembly of claim 3, wherein the force profile includes a first high resistance area near a first end limit of travel of the first structure with respect to the second structure, a second high resistance area near a second end limit of travel of the first structure with respect to the second structure, and an intermediate area between the first high resistance area and the second high resistance area, wherein the magnitude of the feedback force applied when the current angular position is in the first high resistance area and the second high resistance area is greater than the magnitude of the feedback force applied when the current angular position is in the intermediate area.

6. The assembly of claim 3, wherein the force profile includes one or more simulated detent positions, wherein the feedback force is applied to the first structure toward the simulated detent positions when the current angular position is within a threshold value from the simulated detent positions.

7. The assembly of claim 1, wherein the motion control component includes a stepper motor that applies the feedback force by application of torque to the hinge.

8. The assembly of claim 1, wherein the motion control component includes piezoelectric elements that vary the magnitude of the feedback force.

9. The assembly of claim 1, further comprising:
a display screen located on the first structure.

10. The assembly of claim 1, wherein the first structure is a display screen portion of a laptop computer and the second structure is a base portion of the laptop computer.

11. An assembly, comprising:
a first structure;
a second structure;
a hinge that connects the first structure to the second structure for rotation of the first structure relative to the second structure around an axis; and
a motion control component that applies a feedback force to the hinge in response to an external force that is applied to the first structure,
a display screen located on the first structure; and
a light sensor that is located on the first structure and outputs a light signal, wherein the controller determines a glare estimate based on the light signal and sets a simulated detent position at an angular position of the first structure with respect to the second structure that minimizes glare from light incident on the display screen, wherein the motion control component applies the feedback force to the first structure toward the simulated detent position when a current angular position of the first structure with respect to the second structure is within a threshold value relative to the simulated detent position.

12. The assembly of claim 11, wherein the first structure is a display screen portion of a laptop computer and the second structure is a base portion of the laptop computer.

13. The assembly of claim 11, wherein the motion control component includes a stepper motor that applies the feedback force by application of torque to the hinge.

14. The assembly of claim 11, wherein the motion control component includes piezoelectric elements that vary the magnitude of the feedback force.

15. An assembly, comprising:
a first structure;
a second structure;
a hinge that connects the first structure to the second structure for rotation of the first structure relative to the second structure around an axis;
a touch sensor that detects contact by a user, wherein the touch sensor outputs a touch signal, wherein the touch sensor is an electrical sensor that detects contact by the user by monitoring an electrical signal; and
a motion control component that applies a feedback force to the hinge according to a first force profile to restrain motion of the first structure relative to the second structure when the touch signal is below a threshold and applies the feedback force to the hinge according to a second force profile in opposition to a direction of an external force applied by the user when the touch signal is above the threshold.

16. The assembly of claim 15, further comprising:
a position sensor that outputs a position signal indicative of a current angular position of the first structure relative to the second structure, wherein the feedback force is determined based on the current angular position.

17. The assembly of claim 15, further comprising:
a display screen located on the first structure.

18. The assembly of claim 15, wherein the first structure is a display screen portion of a laptop computer and the second structure is a base portion of the laptop computer.

19. The assembly of claim 15, wherein the motion control component includes a stepper motor that applies the feedback force by application of torque to the hinge.

20. The assembly of claim 15, wherein the motion control component includes piezoelectric elements that vary the magnitude of the feedback force.

* * * * *